(12) United States Patent
Cole

(10) Patent No.: US 6,829,304 B1
(45) Date of Patent: Dec. 7, 2004

(54) METHOD FOR CLOCK RECOVERY IN MPEG SYSTEMS

(75) Inventor: Paul Dana Cole, Fairfield, CT (US)

(73) Assignee: VBrick Systems, Inc., Wallingford, CT (US)

( * ) Notice: Subject to any disclaimer, the term of this patent is extended or adjusted under 35 U.S.C. 154(b) by 483 days.

(21) Appl. No.: 09/957,430

(22) Filed: Sep. 20, 2001

(51) Int. Cl.[7] .............................. H04B 1/66
(52) U.S. Cl. .................. 375/240.26; 375/240.27; 375/240.28; 375/240.25; 375/354; 375/362; 375/355; 348/500; 348/512; 348/516; 348/521; 348/524; 370/509; 370/516; 370/510; 370/512; 370/514; 370/503; 386/109; 386/119
(58) Field of Search ............. 375/240.26, 240.25, 375/240.27, 240.28, 354, 362, 355; 348/512, 500, 516, 521, 524; 370/509, 510, 514, 516, 512, 503; 386/109, 119; 382/233

(56) References Cited

U.S. PATENT DOCUMENTS

| | | | |
|---|---|---|---|
| 6,011,869 A | * | 1/2000 | Ohta et al. ............... 382/233 |
| 6,028,648 A | * | 2/2000 | Yu ....................... 375/240.27 |
| 6,173,114 B1 | * | 1/2001 | Yanagihara et al. ........ 386/109 |
| 6,195,368 B1 | * | 2/2001 | Gratacap .................... 370/535 |
| 6,356,871 B1 | * | 3/2002 | Hemkumar et al. ........ 704/500 |

\* cited by examiner

Primary Examiner—Shawn S. An
(74) Attorney, Agent, or Firm—Alix, Yale & Ristas, LLP

(57) ABSTRACT

A method for clock recovery comprises a series of steps to be performed in a decoder to adaptively estimate the ratio P/S of the frequency of an encoder system time clock and the frequency of a decoder. The steps include performing a series of overlapping trials N which calculate time differentials dP(n), dS(n), respectively) between selected pairs of temporally separated clock references CRs and arrival times STCs. Each trial concludes by calculating an estimated ratio X according to the formula:

$$X(N) = (\Sigma dP(n))/(\Sigma dS(n))$$

A preferred embodiment of the present invention also includes the step of adjusting the decoder clock in accordance with a damped version of the estimate, thereby "recovering" the encoder STC in the decoder.

11 Claims, 3 Drawing Sheets

METHOD FOR CLOCK RECOVERY IN MPEG SYSTEMS

BACKGROUND OF THE INVENTION

1. Field of the Invention

This invention generally relates to clock recovery in digital communications equipment, and more particularly to a method and system for adaptively and continuously estimating the relationship between a Moving Pictures Experts Group ("MPEG") encoder time clock and an MPEG decoder time clock and adjusting the decoder time clock in accordance with the estimate.

2. Description of the Related Art

MPEG-1 and MPEG-2 are industry standards for the compression of digital audio-video programs for storage and transmission. Digital audiovisual programs are compressed or "encoded" for storage and transmission. To be viewed, the program must be decompressed or "decoded". Herein, the term "program" means a collection of related audio-video signals having a common time base and intended for synchronized presentation.

The MPEG standards provide for hierarchically layered data streams. That is, an audio-video program is composed of one or more coded bit streams or "elementary streams" ("ES") such as an encoded video ES, an encoded audio ES, a second language encoded audio ES, a closed caption text ES, etc. Each ES, in particular, each of the audio and video ESs, is separately encoded. The encoded ESs are then combined into a systems layer stream such as a program stream ("PS") or a transport stream ("TS"). A PS is comprised of variable length packetized elementary stream or "PES" packets containing data for only a single ES. To form a TS, PES packets are divided into a number of payload units and inserted into fixed length (188 byte long) transport packets. The purpose of the PS or TS is to enable extraction of the encoded ESs of a program, separation and separate decoding of each ES and synchronized presentation of the decoded ESs to accurately reproduce the encoded program.

The ESs of each program are encoded in relation to a single encoder system time clock ("STC"). Likewise, the decoding and synchronized presentation of the ESs are ideally synchronized in relation to the same encoder system time clock. Thus, the decoder must be able to recover the original encoder STC to decode each ES and present each decoded ES in a timely and mutually synchronized fashion. To that end, samples of the STC, called clock references (CRs), are inserted selectively into the systems layer streams.

The MPEG standard schedules presentation of audio and video with respect to a 90 KHz clock. In MPEG-2, the 90 KHz STC is obtained from a 27 MHz clock. In MPEG-1, the STC is the 90 KHz clock. An MPEG receiver ideally attempts to recover the exact frequency of the transmitter's STC, in order to decode and present audio and video as they were, prior to their being encoded and sent by the transmitter. Even if the clock frequency recovery can occur only imperfectly, there is another reason for recovering the transmitter's STC: with properly encoded MPEG streams, and with a perfectly recovered STC, scheduling mechanisms specified by the MPEG standards keep the buffers, in which the receiver stores encoded audio and video, from backing up.

To facilitate clock recovery, clock references are embedded in MPEG streams as discussed above. The MPEG terminology for a clock reference is either system clock reference ("SCR") or program clock reference ("PCR"), depending upon the type of stream (PS or TS) being discussed. Here, we refer simply to a clock reference because the type of clock reference is irrelevant for the purposes of this discussion. A clock reference is a bitfield, typically representing the value of the STC at the moment when the bitfield "should" enter a certain abstractly-defined buffer, which itself is part of one of the abstractly-defined models put forward in the MPEG systems standards. An MPEG decoder extracts clock references from the MPEG stream and uses the clock references to recover the encoder STC.

The clock recovery problem is complicated by the fact that the decoder clock is not synchronized with the encoder STC; in particular, it does not begin running at the same time. Further, any two independently running clocks will tend to "drift" or run alternately (or consistently) fast or slow relative to each other. Over time, this clock drift can accumulate to levels that will interfere with accurate reproduction of the encoded program.

Prior art MPEG receiver/decoders typically incorporate some means for tracking the relationship between the encoder STC and the corresponding clock in the receiver decoder. Clock tracking and adjustment means usually incorporate a microprocessor having access to the clock reference bitfields as well as the receiver/decoder STC. The microprocessor is provided with program steps for comparing the encoder STC (reflected in the clock reference bitfields) with the receiver/decoder STC, establishing a relationship between the clocks and adjusting the receiver/decoder STC to more closely approximate the frequency of the STC. One such method is discussed in U.S. Pat. No. 6,195,368.

Such clock recovery and adjustment must be accomplished to an acceptable degree of accuracy and within the time constraints of an MPEG stream. The relationship between the encoder STC and the receiver/decoder STC must be updated frequently to maintain the accuracy of the presentation and avoid buffer overflow/underflow problems as discussed above.

The conventional methods for clock recovery typically employ a phase-locked loop (PLL). Upon initial acquisition of a new program, the STC is set to the current value encoded in the CR. The first CR is typically loaded directly into an STC counter and the PLL is operated as a closed loop. At the moment when each CR arrives at the decoder, the value is compared with the current value of the STC at a subtractor which calculates the difference. The difference is a number which has one portion in units of 90 kHz and one portion in units of 27 MHz. The difference is typically designated the E or error term in the loop. A sequence of E terms is inputted to a low pass filter and gain stage. The output of the stage is a control signal which controls the instantaneous frequency of a voltage-controlled oscillator (VCO). The output of the VCO is an oscillator signal with a nominal frequency of 27 MHz. This signal is used as a system clock frequency within the decoder and is input to a counter. The counter generates the current STC values which have both a 27 MHz extension and a 90 kHz base value. The complete STC is a feedback input to the subtractor. The band width of the PLLs typically has an upper bound which is imposed by the bounded maximum interval between successive CRs. If the CRs are received by the decoder with values in timing that are instantaneously correct samples of the constant frequency STC in the encoder, then the error E in turn converges to a constant value after the loop has reached the locked state. Variations in the instantaneous VCO frequency become essentially zero after the loop is locked. Therefore, for a prototypical PLL technique, the adjustment is typically intimately tied to system hardware and essentially implements a sample by sample adjustment in clock recovery.

SUMMARY OF THE INVENTION

The present invention represents a different approach to clock recovery from that of the conventional PLL type methods by adjusting the clock recovery by means of a statistical calculation which is consistent with the limitations of the associated decoder and buffer. The present method for clock recovery is based on a statistical model derived from the Central Limit Theorem of statistics and is adapted to the application of clock recovery for MPEG systems.

Briefly stated, a preferred embodiment of the present invention is a method comprising a series of steps to be performed in a decoder to adaptively estimate the ratio P/S of the frequency of an encoder system time clock and the frequency of a decoder system time clock. The steps include performing a series of overlapping trials N which calculate time differentials dP(n), dS(n), respectively, between selected pairs of temporally separated clock references CRs and arrival times STCs. Each trial concludes by calculating an estimated ratio X according to the formula:

$$X(N) = (\Sigma dP(n))/(\Sigma dS(n))$$

A preferred embodiment of the present invention also includes the step of adjusting the decoder clock in accordance with a damped version of the estimate, thereby "recovering" the encoder STC in the decoder.

An object of the present invention is to provide a new and improved mathematical model essentially divorced from hardware methods for clock recovery that employs a statistical analysis which is less dependent on corrective system hardware to achieve a high degree of accuracy within the time constraints dictated by MPEG transmissions.

Another object of the invention is to provide a new and improved method for clock recovery that employs a statistical model which is adapted to the decoder processing environment.

Another object of the present invention is to provide a new and improved method for clock recovery that adjusts the receiver/decoder clock to compensate for clock drift which is based on a relatively large number of samples and exhibits a significantly reduced influence from noise samples.

These and other objects, features and advantages of the invention will become readily apparent to those skilled in the art upon reading the description of the preferred embodiment, in conjunction with the accompanying drawings.

DETAILED DESCRIPTION OF THE PREFERRED EMBODIMENT

Figure 1:
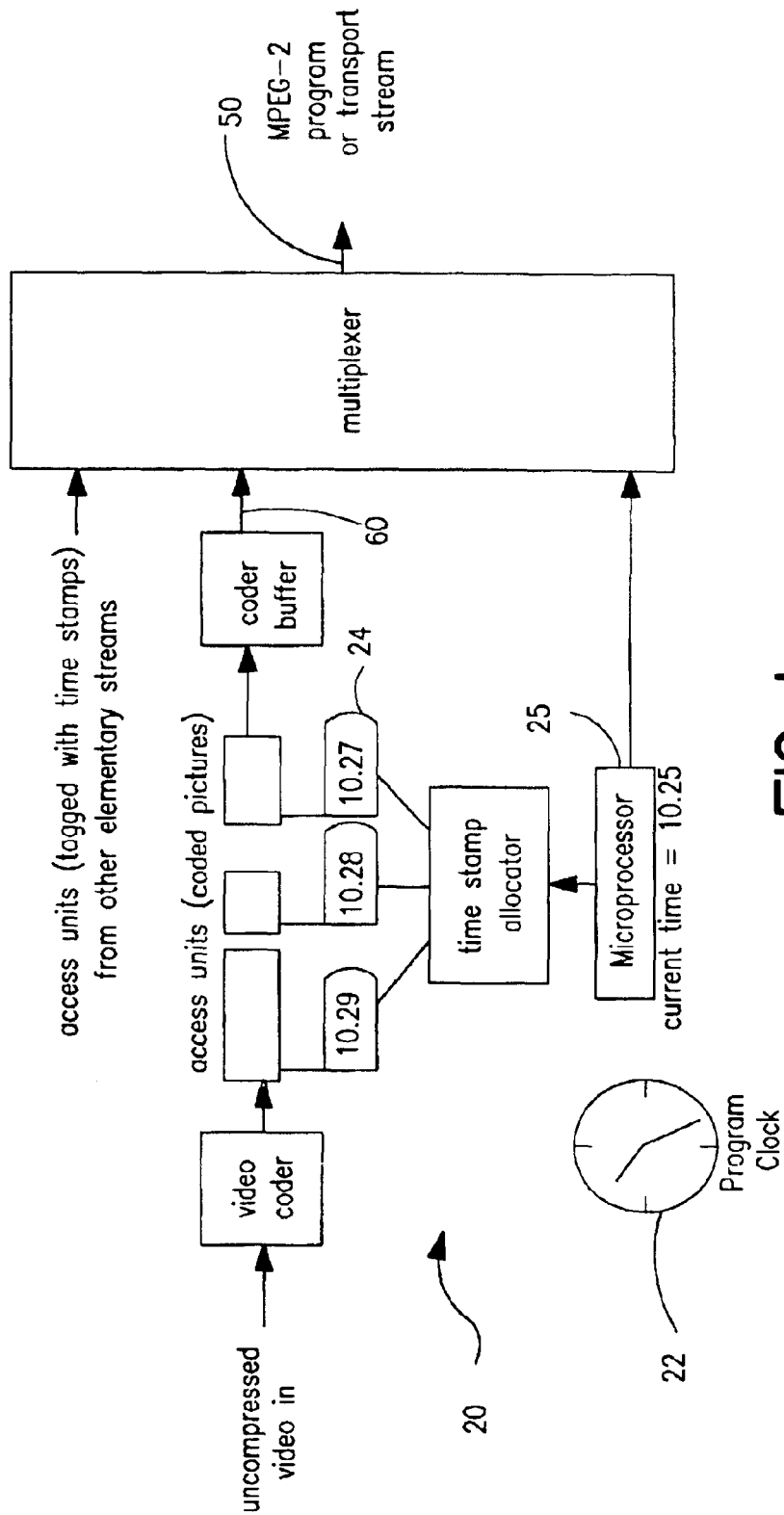
FIG. 1 is a functional block diagram of a prototypical prior art MPEG encoder.

A preferred embodiment of the method for clock recovery in MPEG systems will be discussed in the context of a prototypical prior art MPEG encoder-decoder system illustrated in FIGS. 1 and 2. FIG. 1 illustrates a prototypical prior art MPEG encoder 20 including an STC 22 and a microprocessor 25. The microprocessor contains instructions for assigning time stamps containing clock references 24 to the access units making up an MPEG packetized elementary stream 60. The packetized elementary stream is then multiplexed with other MPEG packetized elementary streams to produce an MPEG program or transport stream 50.

Figure 2:
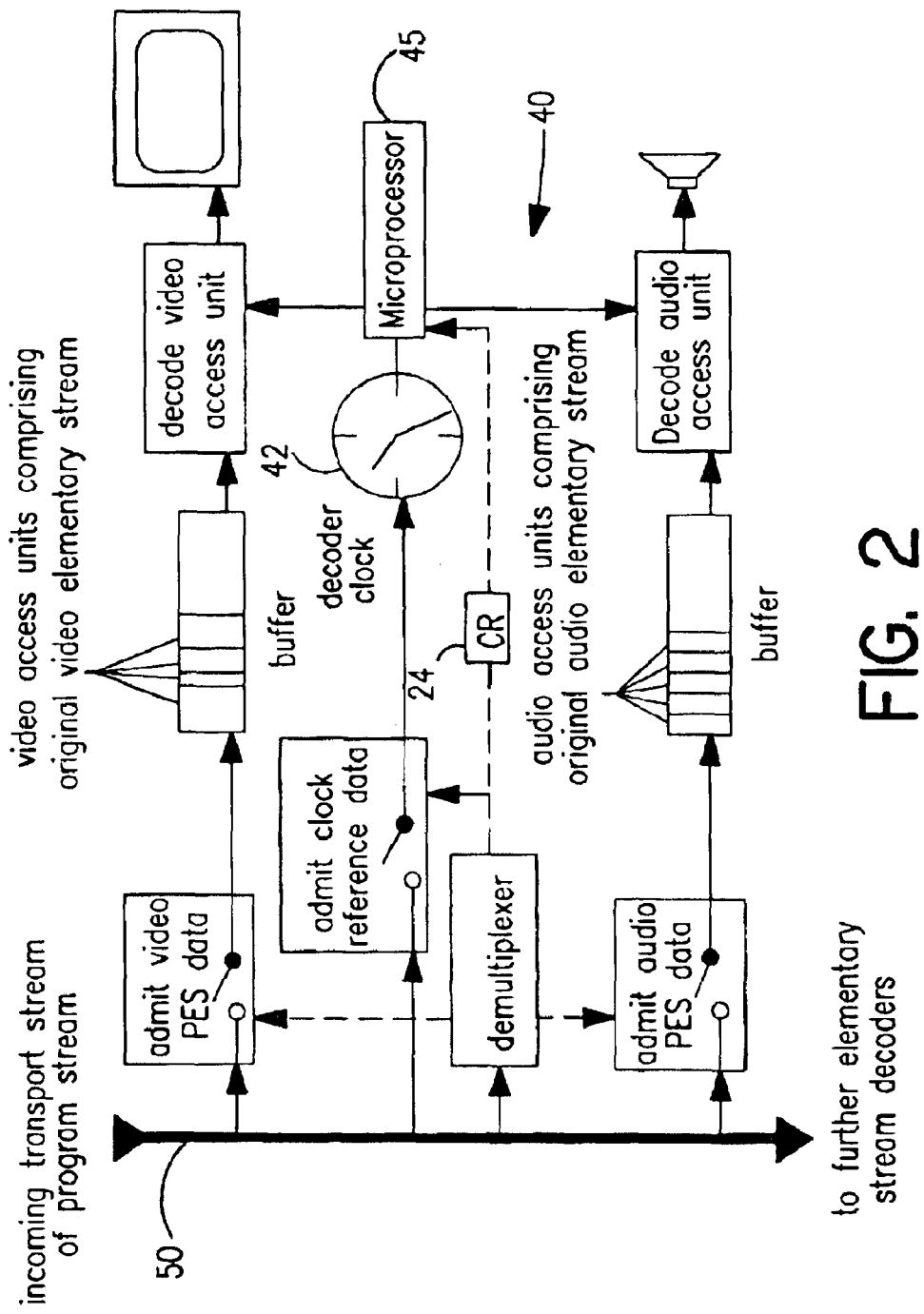
FIG. 2 is a functional block diagram of a prototypical prior art MPEG decoder.

FIG. 2 illustrates a prototypical prior art MPEG decoder 40 including an STC 42 and a microprocessor 45. The decoder 40 extracts clock references 24 from the incoming transport or program stream 50. The microprocessor is programmed with instructions for comparing the incoming clock references 24 with the value of the decoder STC 42 corresponding to the arrival time of the clock references 24. Using its instruction set, the microprocessor 45 then "supervises" the movement of audio and video access units through the decoder to produce an accurate reproduction of the encoded program.

The adaptive method for clock recovery in MPEG systems in accordance with the invention comprises a series of steps that efficiently utilize available data to accurately estimate the relationship between an encoder STC for a program and the corresponding decoder STC. The method also comprises employing an idealized mathematical model to adjust the decoder STC to reflect the estimated relationship between the clocks and minimize the hardware required to implement the adjustment. The logical and mathematical rationale for the inventive clock recovery method is set forth below.

For the purposes of describing the invention, perfect clock recovery would be the situation wherein, for each clock reference, the decoder's STC equals the value of the clock reference, at the moment when the clock reference arrives at the decoder. Furthermore, it can and should be assumed that the encoder generates clock references by setting the value of the clock reference bitfield to be the value of the encoder's STC, sampled at the moment when the clock reference is sent.

Minimal density requirements for clock references can be formulated by specifying the maximum time allowed to elapse between when consecutive clock references are transmitted. For MPEG-2 transport streams, the MPEG-2 systems standard requires that there be no more than 100 milliseconds between when consecutive clock references are transmitted. The DVB standard requires that there be no more than 40 milliseconds. These are lower bounds on clock reference density. Clock references can be transmitted more frequently than the standards require, and they do not need to be transmitted at equally spaced points in time.

Although there is no requirement that clock references be equally spaced, analyzing the clock recovery problem is facilitated by considering the special case when they are. Let us assume that the encoder starts sending clock references when its STC is equal to 0, and sends one clock reference every P seconds (according to its STC), thereafter. Then the values sent are 0, P, 2P, . . . , nP, and clock reference nP is sent at the moment when the encoder's STC is equal to nP seconds.

The decoder's STC is not synchronized to the encoder's STC. In the absence of any impairments except this (i.e., no clock drift, no channel impairments), and with no adjustments of the decoder's STC, the time instants when the clock references are received, when measured by the decoder's STC, will be t, t+S, t+2S, . . . , t+nS, . . . seconds. The t term is a triviality which accounts for the fact that the encoder STC and decoder STC do not necessarily start at the same time. Therefore, the t terms can be effectively eliminated, and the clock reference arrival times, when measured by the decoder's STC, are: 0, S, 2S, ..., nS, ... seconds.

The factor S is the essence of what the decoder needs to obtain, i.e., if the decoder's STC is adjusted by multiplying its frequency by the ratio P/S, then the decoder's STC will exactly match the encoder's STC. The decoder computes P directly. P is the difference between two consecutive clock references. In this highly hypothetical situation, the only real work done by the decoder is its measurement of the time S between receiving two consecutive clock references. Explicitly stated: P>S means that the encoder's STC is fast relative to the decoder's STC; P<S means that the encoder's STC is slow relative to the decoder's STC.

Of course, the "no impairments" model described above is an idealized model. Instead, the arrival times when measured by decoder's STC, are r(0), S+r(1), 2S+r(2), ..., nS+r(n), ... seconds, where r(0), r(1), r(2), ..., r(n), ... is a sequence of identically-distributed random variables. Since we are free to adjust the starting time—"the origin of the time axis", it is assumed that the random variables r(n) have a mean=0. Before continuing, it should be noted that this adjusted model is also idealized, since it does not account for clock drift. However, the inventive method does account for clock drift because it is adaptive, as will be explained below.

Mathematically, the Central Limit Theorem asserts that it is possible to eliminate the random variables r(n) by averaging and reduce to the model where the clock reference arrival times are 0, S, 2S ... (n)S. The inventive method comprises a series of steps in which arrival time data is manipulated to produce an accurate average which closely correlates to the optimum actual transmission compensation values. More specifically, the method comprises steps that achieve a high degree of accuracy within the time constraints presented by the MPEG format. A more subtle consideration is that the method used for averaging should be unbiased. The expected value of its error should be (algebraically equal to) 0, not some non-zero number that will cause the STC to be consistently too fast, or to be consistently too slow (no matter by how negligible an amount).

CR designates "clock reference." The decoder receives a stream of clock references: CR(0), CR(1), ..., CR(n), .... The method samples the decoder's STC when each clock reference is received, thereby creating a corresponding sequence of STC values: STC(0), STC(1), ..., STC(n), .... The translation between this, and the earlier relationships yields the following:

$CR(n)=nP$ $STC(n)=nS+r(n)$ (The earlier formulations present P and S as being constants, and the discussion now moves away from this assumption, while still using it as an approximation of the physical reality.) The data the method analyzes is the series of sample pairs:

(CR(0), STC(0)), (CR(1), STC(1)), . . . , (CR(n), STC(n)), . . . .

The ratio P/S can be approximated to any degree of accuracy, by using samples that are sufficiently far away from one another in time, for example:

$(CR(n+B)-CR(n))/(STC(n+B)-STC(n));$ or $(BP)/(BS+r(n+B)-r(n));$ where B represents some arbitrary integer. As B gets large, these ratios approach P/S. With unlimited time for sampling, an excellent estimate of P/S could be calculated with just two temporally distant (CR, STC) sample pairs. Sampling time is limited by the MPEG format, so an approach is needed that will arrive at an acceptable balance between sampling time and accuracy.

To shorten the waiting time, the method incorporates an estimate of the ratio as follows:

L is a constant;

for each index n, $dP(n)=CR(n+L)-CR(n);$ $dS(n)=STC(n+L)-STC(n);$ and,
K is the number of dP, dS differences used to compute the estimate.
The estimate X is:

$X=(\Sigma dP(n))/(\Sigma dS(n)),$ where the summations range over K consecutive values of the index n.

Using just two (CR, STC) sample pairs would mean using the value K=1, and making L large enough to get the desired accuracy. Instead, K is enlarged, which allows for a smaller value of L. Mathematical analysis suggests that the relationship between K and L should be L=2K.

Because the relationship between the encoder STC and the decoder STC must be maintained over the duration of the program being decoded, the method comprises a series of trials; trial N (N=0, 1, ... ) where each trial N represents the differences dP(n), dS(n), for n=KN, ..., KN+(K−1); i.e., it represents the samples CR(n), CR(n+2K), STC(n), STC(n+2K), for n=KN, ..., KN+(K−1). At the end of each trial N, the method includes the step of calculating the estimate X(N) based on the sample pairs generated.

The decoder's STC is further adjusted by a damped factor, Y(N), which is a function of the estimate X(N). The damped adjustment factor Y(N)=1+u(X(N)−1), where u is a preselected "undercompensation" constant. Experimentation indicates that an undercompensation constant of u=0.5 functions well. Other embodiments of the invention may employ other values of u, where $0<u\leq 1$.

Figure 3:
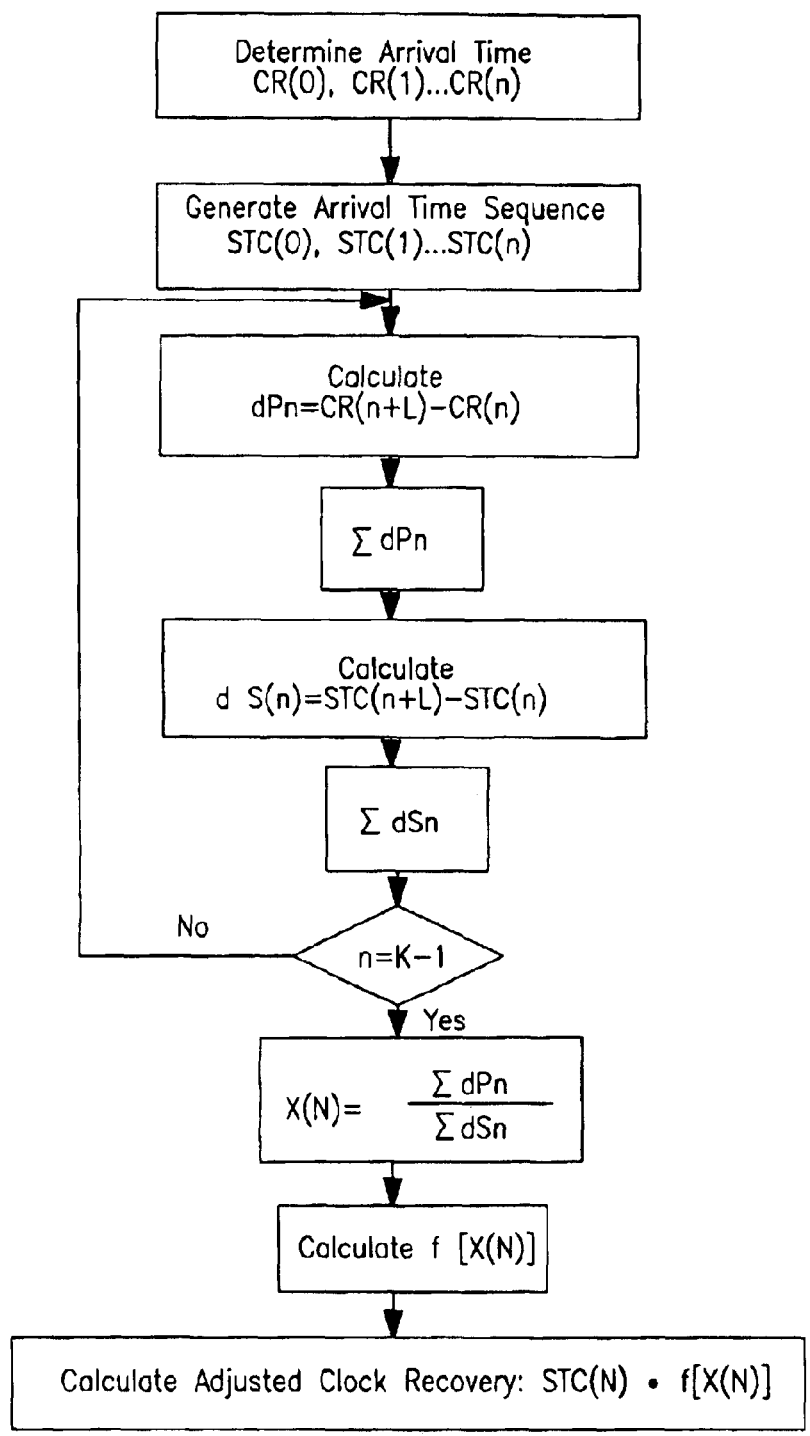
FIG. 3 is a flow chart illustrating one generalized form of the method for clock recovery in accordance with the invention.

A generalized form of the method of clock recovery is illustrated in FIG. 3. Since the decoder STC is adjusted at the end of every trial, S (the interval between consecutive CR arrival times as measured by the decoder STC) is not actually a constant—it changes as the decoder STC is adjusted. This can be conceptualized as a version of S for each trial. In this regard, S(N) is defined as the difference between the first two samples of the decoder's STC after trial N. It is thus expected that S(N) will approach P, as N gets large.

An important feature of the invention is that the samples within consecutive trials N overlap. For example, consider the case when K=2 (so L=4) and N=0, 1, 2.

The data points employed for representative consecutive trials N=0, 1, 2 are listed below:
  TRIAL 0: CR(0), CR(4), CR(1), CR(5), STC(0), STC(4), STC(1), STC(5).

TRIAL 1: CR(2), CR(6), CR(3), CR(7), STC(2), STC(6), STC(3), STC(7).

TRIAL 2: CR(4), CR(8), CR(5), CR(9), STC(4), STC(8), STC(5), STC(9).

In the case just considered, the STC adjustment for trial 0 occurs at the index n=5, whereas, the starting index for trial 1 is n=2, and its ending index is n=7. In general, it is clear that the STC update at the end of trial N only partially influences the time base for the next trial (N+1). Any analytic approach to selecting the undercompensation constant would have to take this into account. The undercompensation constant u selected reflects the overlapping data sets for each trial and the influence of each estimate X(N) on the data used in the subsequent trial (N+1).

The Central Limit Theorem, which is premised on a sequence of independent, identically distributed random variables, establishes that the mean of these random variables can be closely approximated by averaging a certain number of the random variables. It also establishes the trade-off between the number of samples used and the quality of the approximation. In general, the greater the number of samples, the better the approximation. The method of the present invention adapts principles of the Central Limit Theorem to provide a statistically significant adjustment factor based upon a relatively large number of non-correlated variables. The clock recovery adjustment is derived from a calculation intensive algorithm and is not as dependent on hardware such as characteristic of conventional PLL methods. The method strikes a favorable balance between the large numbers of samples used to compute the estimated adjustment and the limitations of the encoder buffer.

The method employs measuring clock references but the calculated adjustments are based on intermittent measurements (chosen so to remove dependence) and do not require the use of consecutively transmitted CR values. Furthermore, the method does not require equally-spaced CR values. The method advantageously employs CR values spaced farther apart in time to reduce correlation between any errors. Thus, the spaced characteristics of the algorithm input values enhance the accuracy of the adjustment values. The method calculations converge to statistically acceptable values within a time interval consistent with the processing requirements of the MPEG data stream.

It should be appreciated that the invention may for some embodiments not provide an STC adjustment for each N, but for a selected subset of N values. For some embodiments, the value of L may be adjusted over time.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A method for calculating adjusted values for a decoder system time clock (STC) of a decoder for decoding an MPEG stream having a series of embedded clock references CR(0), CR(1), CR(2) . . . CR(n), said method comprising:
   (a) determining an arrival time for each clock reference at a decoder as measured by a decoder system time clock (STC);
   (b) generating a sequence of decoder STC time values STC(0), STC(1), STC(2) . . . STC(n) representing the arrival times of a corresponding sequence of clock references CR(0), CR (1), CR(2), . . . , CR(n); and
   (c) performing a series of trials N to calculate an estimate X of the ratio P/S where P is a function of the frequency of the encoder STC, S is a function of the frequency of the decoder STC and N is a non-negative integer, each trial N comprising:
      i) calculating the time differential dP(n) between a pair of clock references (CR(n), CR(n+L)) where L is a constant positive integer, each calculation comprising CR(n+L)−CR(n);
      ii) calculating the time, differential dS(n) between a pair of corresponding clock reference arrival times (STC(n), STC(n+L)), each calculation comprising STC(n+L)−STC(n);
      iii) repeating steps i and ii K times to produce time differentials dP(n) and dS(n) for n=KN, . . . , KN+(K−1), where K is a positive integer; and
      iv) calculating the estimate X(N) according to the formula $X(N)=(\Sigma dP(n))/(\Sigma dS(n))$, where the summations range over K consecutive values of n.

2. The method of claim 1 and further comprising:
   adjusting the decoder STC after each trial N by multiplying by a function of X(N).

3. The method of claim 1 and further comprising:
   adjusting the decoder STC after each trial N by multiplying the value of the STC by a damped adjustment factor.

4. The method of claim 3 wherein the damped adjustment factor Y(N) is given by $Y(N)=1+u(X(N)-1)$, where u is a constant greater than zero but less than 1.

5. The method of claim 3, wherein u=0.5.

6. The method of claim 1, wherein L=2K.

7. A method for calculating adjusted values for a decoder system time clock (STC) in a decoder for decoding an MPEG stream having a series of embedded clock references CR(0), CR(1), CR(2) . . . CR(n), said method comprising:
   (a) determining an arrival time for each clock reference at a decoder as measured by a decoder system time clock (STC);
   (b) generating a sequence of decoder STC time values STC(0), STC(1), STC(2) . . . STC(n) representing the arrival times of a corresponding sequence of clock references CR(0), CR (1), CR(2), . . . , CR(n); and
   (c) performing a series of trials to calculate an estimate X of the ratio P/S where P is a function of the frequency of the encoder STC, S is a function of the frequency of the decoder STC and N is a non-negative integer, each trial N comprising:
      i) calculating a series of time differentials dP(n) between a pair of of clock references (CR(n), CR(n+L)) where L is a positive integer, each calculation comprising CR(n+L)−CR(n);
      ii) calculating a series of time differentials dS(n) between a pair of corresponding of clock reference arrival times (STC(n), STC(n+L)), each calculation comprising STC(n+L)−STC(n); and
      iii) calculating the estimate X(N) according to the formula $X(N)=(\Sigma dP(n))/(\Sigma dS(n))$, where the summations range over consecutive values of n.

8. The method of claim 7 and further comprising:
   adjusting a decoder STC for at least one value of N by multiplying by a function of X(N).

9. The method of claim 7 and further comprising:
   adjusting a decoder STC after at least one trial of N by multiplying by a damped adjustment factor.

10. The method of claim 9 wherein the damped adjustment factor Y(N) is given by $Y(N)=1+u(X(N)-1)$, where u is a constant greater than zero but less than 1.

11. The method of claim 10 wherein u=0.5.

* * * * *

UNITED STATES PATENT AND TRADEMARK OFFICE
CERTIFICATE OF CORRECTION

PATENT NO. : 6,829,304 B1  Page 1 of 1
DATED : December 7, 2004
INVENTOR(S) : Boldin It is certified that error appears in the above-identified patent and that said Letters Patent is hereby corrected as shown below:

Column 8,
Line 40, after "trials" insert -- N --.

Signed and Sealed this

Thirteenth Day of June, 2006

JON W. DUDAS
*Director of the United States Patent and Trademark Office*